June 18, 1940. E. L. WALTERS 2,205,003
METHOD AND APPARATUS FOR USE IN THE MANUFACTURE OF LAMINATED SAFETY GLASS
Filed July 14, 1938 4 Sheets-Sheet 1

Inventor
EMMETT L. WALTERS
Attorney

Inventor
EMMETT L. WALTERS.
By Frank Fraser
Attorney

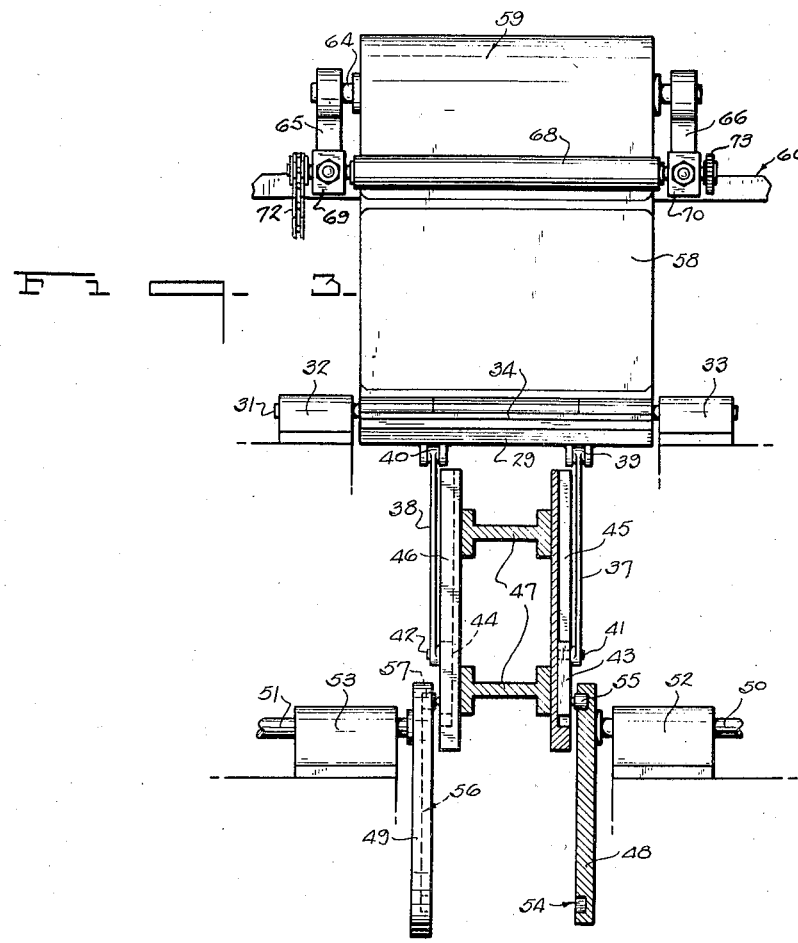
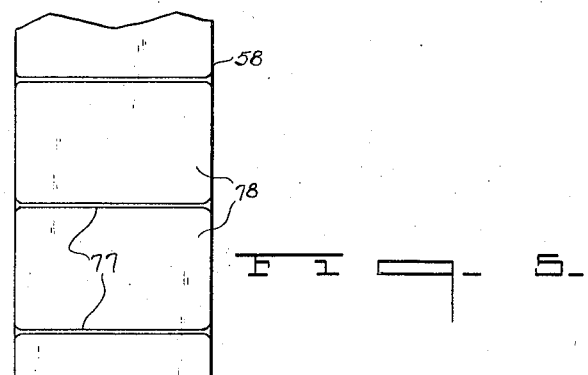

June 18, 1940.　　　　E. L. WALTERS　　　　2,205,003
METHOD AND APPARATUS FOR USE IN THE MANUFACTURE OF LAMINATED SAFETY GLASS
Filed July 14, 1938　　　　4 Sheets-Sheet 4

Inventor
EMMETT L. WALTERS.
By Frank Fraser
Attorney

Patented June 18, 1940

2,205,003

UNITED STATES PATENT OFFICE 2,205,003

METHOD AND APPARATUS FOR USE IN THE MANUFACTURE OF LAMINATED SAFETY GLASS

Emmett L. Walters, Toledo, Ohio, assignor to Libbey-Owens-Ford Glass Company, Toledo, Ohio, a corporation of Ohio Application July 14, 1938, Serial No. 219,167

11 Claims. (Cl. 49—81.5)

The present invention relates to the manufacture of laminated safety glass which ordinarily comprises two sheets or plates of glass and an interposed layer of strengthening material bonded to the glass sheets to provide a composite structure.

In assembling the several laminations preparatory to the uniting thereof, great care must be exercised to see that they are accurately aligned with one another, since in the event they are not properly assembled, unnecessary grinding of the edges of the finished laminated sheet may be required. This assembling has heretofore been carried out largely by hand which has not proven entirely satisfactory as the operator does not always properly line up the edges of the glass sheets.

An important object of the invention is the provision of an improved method and apparatus whereby the glass sheets and strengthening material may be easily and quickly assembled in such a manner that they are accurately positioned relative to one another so as to minimize the amount of grinding required after the laminations have been joined.

Another important object of the invention is the provision of assembling apparatus of relatively simple, inexpensive construction, positive and efficient in operation and which may be used in connection with either a continuous sheet of strengthening material or with individual sheets thereof.

Another important object of the invention is the provision of a novel method of assembling the component parts of the "sandwich" wherein a continuous sheet of strengthening material is first scored to correspond substantially to the shape and size of the glass sheets after which the glass sheets are then applied to opposite sides of the strengthening material and moved relative thereto to sever the said strengthening material along the score lines.

Other objects and advantages of the invention will become more apparent during the course of the following description, when taken in connection with the accompanying drawings.

In the drawings, wherein like numerals are employed to designate like parts throughout the same:

Fig. 3 is a vertical section taken substantially on line 3—3 of Fig. 2;

Fig. 6 is a diagrammatic view illustrating a modified type of strengthening material feeding means.

In carrying out the invention, any desired kind of material may be used for the strengthening interlayer and therefore the invention is not limited to the use of any particular material nor to any special process for bonding the laminations after assembling. However, the invention is of particular utility in the making of laminated safety glass in which the strengthening material or reinforcing interlayer is of a synthetic resin and also wherein it is in the form of a continuous sheet or ribbon. Various kinds of resin may be employed as well known in the art, the resin preferably used being a vinyl acetal. Also, while it may be preferred to use a synthetic resin of the type which may be secured to the glass sheets by the application of heat and pressure without the use of cement, it will be understood that strengthening material requiring cement may also be utilized by coating the faces of the glass sheets with a suitable cement prior to the assembling thereof with the strengthening material. It is also possible to use one of the cellulose derivative plastics such as cellulose nitrate, cellulose acetate, or ethyl cellulose.

Figure 1:
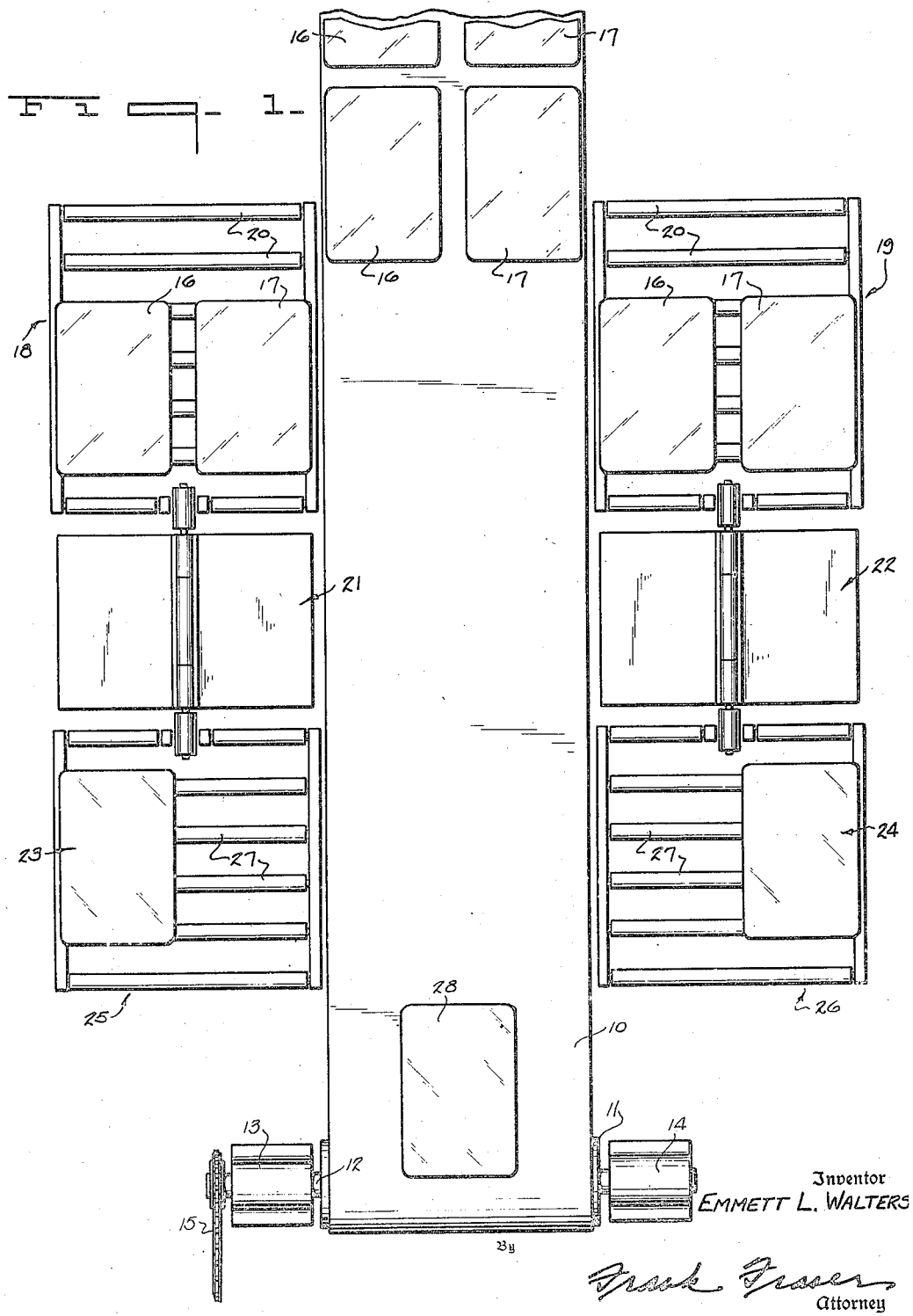
Fig. 1 is a plan view of assembling apparatus constructed in accordance with the invention showing it in association with one type of factory installation but with the strengthening material feeding means being omitted.

In Fig. 1 of the drawings is illustrated a typical factory installation in which the present invention may be embodied, although other arrangements may also be used to suit different factory set-ups. The installation here shown by way of example, however, includes an endless conveyor 10 trained at each end about a roller or drum 11 carreid upon a shaft 12 which is journaled at its opposite ends in bearings 13 and 14. One of the drums 11 is adapted to be positively driven in any suitable manner, such as by means of a chain and sprocket drive or the like 15. The glass sheets are adapted to be laid side by side in pairs upon the receiving end of the conveyor as indicated at 16 and 17, with the sheets of each pair being of the same shape and size.

Arranged at opposite sides of the endless conveyor 10 are the receiving conveyor tables 18 and 19, each including a series of horizontally aligned rolls 20. As the glass sheets 16 and 17 move opposite the conveyor tables 18 and 19, one pair of sheets is adapted to be moved transversely onto conveyor table 18 and the next pair of sheets onto conveyor table 19. At this time, the rollers 20 of said conveyor tables are stationary but after a pair of glass sheets 16 and 17 is arranged side by side on conveyor table 18 and another pair of glass sheets is arranged side by side on conveyor table 19, the rollers 20 are placed in operation to advance the said sheets forwardly to the assembling units 21 and 22 respectively.

After the glass sheets are properly assembled with the strengthening material, as will be hereinafter fully described, the sandwiches so formed and indicated at 23 and 24 are delivered onto the conveyor tables 25 and 26 respectively, each also including a plurality of horizontally aligned rolls 27. After the sandwiches are received upon the conveyor tables 25 and 26, the rolls 27 thereof are stopped and the sandwiches moved inwardly onto the endless conveyor 10 which carries them forwardly as shown at 28 to any desired point. Upon being removed from the conveyor, the assembled laminations can be bonded together in accordance with any conventional or preferred process. Among the advantages of an installation such as described above is that the assembly is speeded up and if the conveyor 10 travels too fast, the glass sheets not needed can be passed on without the necessity of stopping the conveyor so that no piling up of the sheets will occur. Also, any large stock sizes or shapes in small quantity which might not warrant the expense of the assembly units could also be passed on. The glass sheets 16 and 17 can be moved onto the conveyor tables 18 and 19 and the assembled sandwiches 23 and 24 moved from conveyor tables 25 and 26 onto the endless conveyor either manually or by suitable pushing apparatus.

The construction and operation of the assembling units 21 and 22 is disclosed more fully in Figs. 2 and 3, and since both assembling units are the same, a detailed description of only one will be given. Each unit 21 and 22 comprises a pair of flat tables or platens 29 and 30 hinged together at their inner ends upon a horizontal pin 31 which is mounted at its opposite ends in bearings 32 and 33. The tables 29 and 30 are movable from a substantially horizontal position, as shown in full lines in Fig. 2, to a substantialy vertical position as indicated by the broken lines A. The glass sheets or plates 34 and 35 are adapted to be laid upon the upper surfaces of the tables while they are in substantially horizontal position and in order to insure that the lower edges of said sheets shall be in alignment when they are swung to vertical position, each of the tables is notched adjacent its inner end as indicated at 36 to form a shoulder against which the inner edge of the glass sheet abuts.

The tables 29 and 30 are oscillated from horizontal to vertical position by reciprocating movement of the substantially vertical lever arms 37 and 38 respectively, said arms being pivotally connected at their upper ends to the tables 29 and 30 as at 39 and 40 respectively. Pivotally connected to the lower ends of lever arms 37 and 38, as at 41 and 42, are the substantially rectangular slide blocks 43 and 44 respectively mounted for vertical sliding movement in the stationary channel members 45 and 46 secured in fixed position in any desirable manner such as by the I-beams 47.

Associated with the vertical channel members 45 and 46, adjacent the lower ends thereof are the rotatable cams 48 and 49 respectively, said cams being also disposed in vertical position and carried adjacent one end by the shafts 50 and 51 respectively journaled in bearings 52 and 53. Formed upon the inner face of cam 48 is a continuous groove 54 and loosely received therein is a roller 55 carried by the slide block 43. The cam 49 is likewise formed upon its inner face with a substantially similar continuous groove 56 receiving loosely therein the roller 57 carried at the lower end of slide block 44. Upon rotation of the cams 48 and 49, the rollers 55 and 57, riding in grooves 54 and 56, will cause the lever arms 37 and 38 to be moved upwardly and downwardly to oscillate the tables 29 and 30 from horizontal to vertical position.

Figure 4:
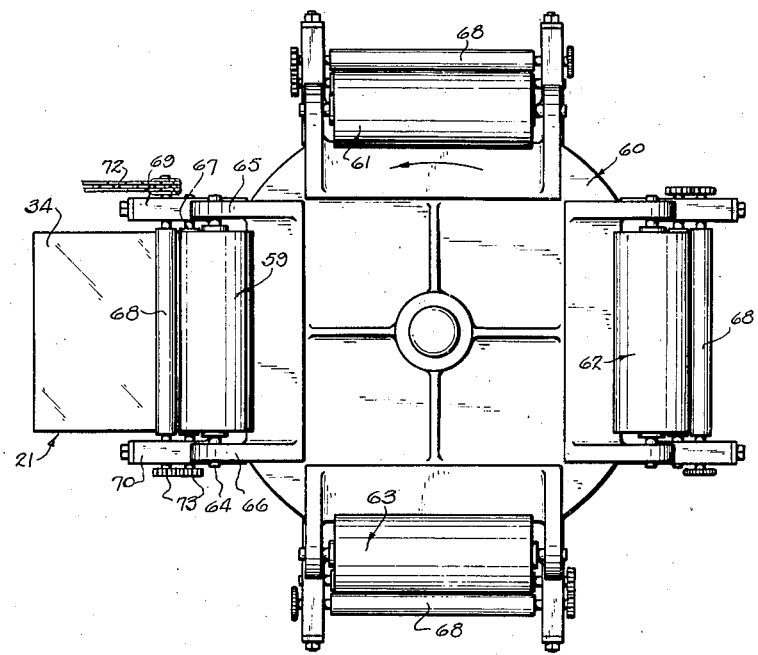
Fig. 4 is a plan view of the strengthening material feeding means.

When the tables 29 and 30 are moved to their vertical broken line positon A, they are adapted to engage and clamp therebetween the strengthening material 58 which forms the plastic interlayer of the finished laminated sheet. The strengthening material is in the form of a continuous sheet or ribbon wound upon a roll 59 mounted above the assembling unit. The roll 59 is carried by a turn-table 60 which also carries, as shown in Fig. 4, three other rolls of strengthening material 61, 62 and 63 which may be of different widths or different kinds of plastic. Each roll of plastic material is carried upon a horizontal shaft 64 rotatably supported at its opposite ends in bearing arms 65 and 66 carried by said turn-table.

The means for feeding the strengthening material 58 downwardly between the glass sheets includes the horizontally spaced feed rolls 67 and 68 carried at their opposite ends in bearing brackets 69 and 70. The feed roll 67 can be mounted in a fixed position, while the feed roll 68 is yieldably urged toward roll 67 by compression springs 71 carried in the bearing brackets 69 and 70. One of the feed rolls, and as here shown roll 68, is preferably positively driven by a chain and sprocket drive or the like 72, while roll 67 is driven from roll 68 by the intermeshing gears 73 carried by the roll shafts. The turntable 60 is mounted upon a vertical shaft 74 and driven in any desired manner as by means of a worm 75 meshing with worm gear 76.

Figure 2:
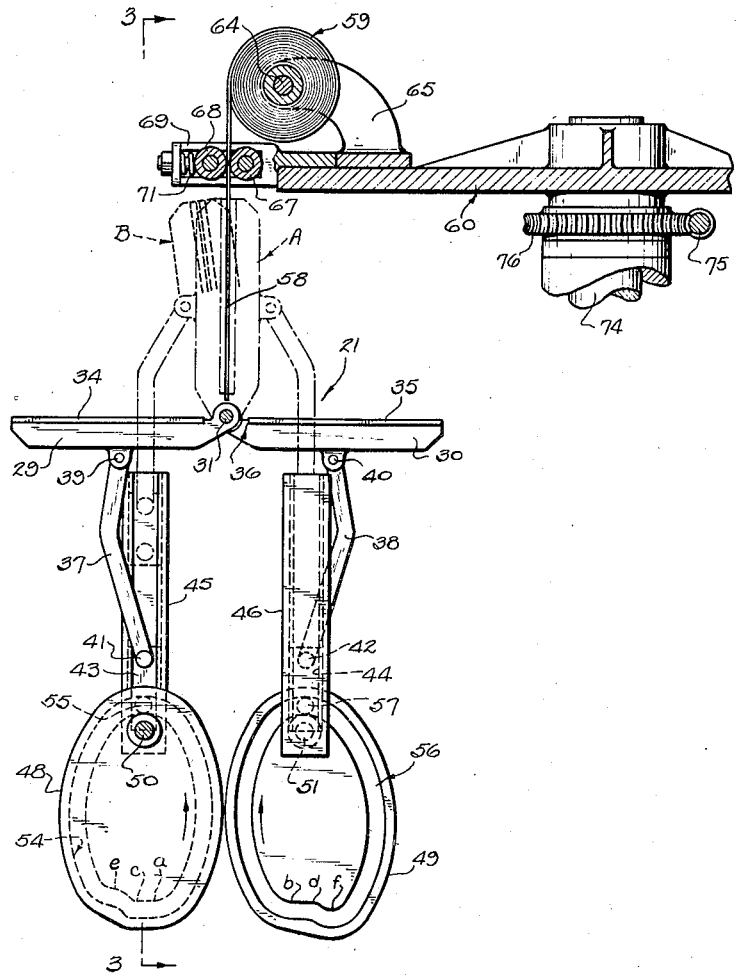
Fig. 2 is a side elevation of the assembling apparatus, with the strengthening material feeding means being shown in transverse section.

When assembling two sheets of glass and an interposed layer of strengthening material, the tables 29 and 30 are first moved into horizontal position as shown in full lines in Fig. 2 at which time the lever arms 37 and 38, slide blocks 43 and 44, and cams 48 and 49 will also be in the relative positions indicated in full lines. The glass sheets 34 and 35 are then properly placed upon the tables and the cams 48 and 49 started rotating in opposite directions as indicated by the arrows. When this is done, the rollers 55 and 57, running in grooves 54 and 56, will cause the slide blocks 43 and 44 to move upwardly in the channel members 45 and 46 to thereby swing the tables upwardly to vertical broken line position A. When the tables reach their vertical position, the roller 55 will be disposed at the point a in groove 54 of cam 48 while the roller 57 will be disposed at the corresponding point b in the groove 56 of cam 49. During the travel of the cam 48 from point a to point c and likewise during the travel of cam 49 from points b to d, the tables will be maintained stationary or, in other words, will dwell in vertical broken line positon A. At this time, the glass sheets 34 and 35 will be held in clamping engagement with the strengthening material 58 which has been fed downwardly therebetween. Upon continued movement of cam 48 from point c to point e, the lever arm 37 will start on its downward movement to lower table 29, and simultaneously the cam 49, in passing from point d to point f, will swing the table 30 past vertical center so that the said tables, while still clamping the strengthening material therebetween, will be moved at an angle to the broken line position B. This movement accomplishes two purposes; first, it serves to tear or sever the strengthening material 58 and second, it results in the laying of the assembled laminations upon the table 29 so that the assembly can be properly lowered to horizontal position when, upon continued rotation of the cams 48 and 49, the rollers 55 and 57 pass beyond points e and f respectively and draw the lever arms 37 and 38 downwardly to return the tables to horizontal position.

Figure 5:
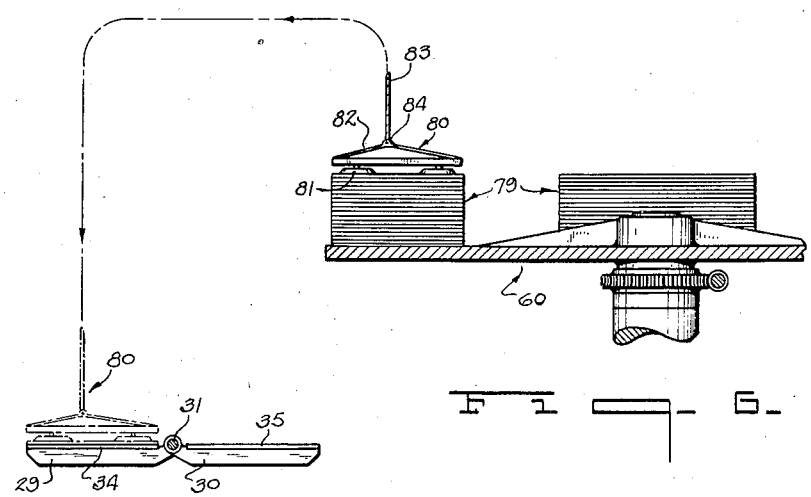
Fig. 5 shows a portion of a continuous sheet of strengthening material and the manner in which it is scored before assembling.

In practice, it is preferred, although not essential, that the strengthening material 58 be first scored to conform to the shape and size of the glass sheets before being wound upon the roll 59. For example, as shown in Fig. 5, the plastic sheeting is scored transversely along the lines 77 to form sections 78 which are of substantially the same shape and size as the glass sheets 34 and 35. With this arrangement, the plastic sheeting is fed intermittently downwardly to properly position successive sections 78 for engagement by the glass sheets. The tables 29 and 30 are swung upwardly as above described to bring the glass sheets into clamping engagement with opposite faces of the strengthening material and while the said strengthening material is firmly clamped between the glass sheets, the table 30 will be swung to the left beyond vertical center, simultaneous with the lowering of table 29, so that the said tables assume the broken line position B. This movement of the tables will cause the strengthening material to be broken or sheared along the score line 77. With this method, it will be obvious that the glass sheets and plastic can be perfectly matched. Of course, if desired, the plastic need not be previously scored but can be fed downwardly between the glass sheet and while clamped therebetween severed by suitable shears. The four rolls of strengthening material carried by the turn-table 60 can be of different widths and scored for different shapes and sizes of glass sheets. By simply rotating the turn-table, the desired roll can be brought into position above the assembling unit. When employing a turn-table carrying four rolls of strengthening material (Fig. 4) with the assembling apparatus of Fig. 1, two of the rolls of strengthening material, as for example rolls 59 and 62, will be used with the assembling units 21 and 22 respectively, while the other two rolls 61 and 63 of strengthening material will be maintained as reserve rolls.

In Fig. 6 is illustrated a slightly modified arrangement for positioning the strengthening material between the glass sheets 34 and 35 while they are supported upon the tables 29 and 30. As here shown, instead of the turn-table 60 carrying a plurality of rolls of plastic, the plastic is first cut into individual sheets of the proper shape and size and then laid upon said table in a plurality of stacks 79. The sheets are then removed singly from the desired stack by means of a vacuum lifting device 80 and placed upon the glass sheets 34 as designated in broken lines. The vacuum lifting device includes a plurality of suction cups 81 carried by a frame 82 which is suspended at the lower end of a cable or the like 83. The point at which the cable 83 is attached to the frame 82, as indicated at 84, is offset with respect to the center of said frame so that the sheets of plastic may be readily removed or stripped one at at a time from the stack 79.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a sheet of strengthening material between the tables, means for raising said tables to substantially vertical position to clamp the strengthening material between the glass sheets, and means for swinging one of said tables past vertical center to lay the assembled sheets upon the other table which is then lowered to bring said assembly to substantially horizontal position.

2. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a continuous sheet of strengthening material downwardly between the tables, means for raising said tables to substantially vertical position to clamp the strengthening material between the glass sheets and for subsequently lowering the same, and means for swinging one of said tables past vertical center simultaneous with the lowering of the other table to sever the strengthening material.

3. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a sheet of strengthening material between the tables, and cam means for raising said tables to substantially vertical position to clamp the strengthening material therebetween and for then lowering the same, said cam means being effective for also swinging one of said tables past vertical center simultaneous with the lowering of the other table to lay the assembled sheets upon said last mentioned table.

4. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a continuous sheet of strengthening material downwardly between the tables, and rotatable cam means for raising said tables to substantially vertical position to clamp the strengthening material therebetween and for then lowering the same, said cam means being effective for also swinging one of said tables past vertical center simultaneous with the lowering of the other table to sever the strengthening material.

5. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a sheet of strengthening material between the tables, means for raising the tables to substantially vertical position to clamp the strengthening material between the glass sheets and for then lowering the same including a lever arm pivoted to each table and a rotatable cam with which said arm is operatively connected, and means for rotating said cams to raise said lever arms and effect upward swinging movement of said tables, one of said cams being effective for swinging the corresponding table past vertical center to lay the assembled sheets upon the other of said tables.

6. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a continuous sheet of strengthening material downwardly between the tables, means for raising the tables to substantially vertical position to clamp the strengthening material between the glass sheets and for then lowering the same including a lever arm pivoted to each table, a vertical guide member for each lever arm, a slide block pivoted to the respective lever arm and slidable vertically in the corresponding guide member, a rotatable cam with which said slide block is operatively connected, and means for rotating said cams to move said lever arms upwardly to swing the tables to substantially vertical position, one of said cams being effective for swinging the corresponding table past vertical center to lay the assembled sheets upon the other of said tables.

7. The method of assembling two sheets of glass and an interposed layer of strengthening material preliminary to the uniting thereof to form safety glass, consisting in first scoring a sheet of strengthening material to correspond to the shape and size of the glass sheets, then applying a pair of glass sheets to opposite sides of the strengthening material, with the score lines thereof arranged outwardly of the edges of said sheet, and in then moving the glass sheets while maintained in clamping engagement with the strengthening material relative to said material to sever the same along the score lines.

8. The method of assembling two sheets of glass and an interposed layer of strengthening material preliminary to the uniting thereof to form safety glass, consisting in first scoring a continuous sheet of strengthening material to form sections corresponding to the shape and size of the glass sheets, feeding said strengening material downwardly, applying a pair of glass sheets to opposite sides of each section of strengthening material, and in then moving the glass sheets while maintained in clamping engagement with the strengthening material relative to said material to sever the same along the score lines.

9. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a sheet of strengthening material between the tables, means for raising said tables to substantially vertical position to clamp the strengthening material between the glass sheets, and means on said tables engaging the lower edges of the glass sheets when said sheets are moved to vertical position to maintain said edges in alignment with one another and the glass sheets in place between said tables.

10. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a sheet of strengthening material between the tables, cam means for raising said tables to substantially vertical position to clamp the strengthening material therebetween and for then lowering the same, and means on said tables engaging the lower edges of the glass sheets when said sheets are moved to vertical position to maintain said edges in alignment with one another and the glass sheets in place between said tables.

11. In apparatus for assembling two sheets of glass and an interposed layer of strengthening material preliminary to the uniting thereof to form safety glass, a pair of tables pivotally mounted at their inner adjacent ends and movable from a substantially horizontal position to a substantially vertical position, the glass sheets being laid upon said tables while in substantially horizontal position, means for feeding a sheet of strengthening material between the tables, means for raising the tables to substantially vertical position to clamp the strengthening material between the glass sheets and for then lowering the same including a lever arm pivoted to each table and a rotatable cam with which said arm is operatively connected, means for rotating said cams to raise said lever arms and effect upward swinging movement of said tables, and means on said tables engaging the lower edges of the glass sheets when said sheets are moved to vertical position to maintain said edges in alignment with one another and the glass sheets in place between said tables.

EMMETT L. WALTERS.